United States Patent [11] 3,613,028

[72] Inventor Harold Seidel
Warren, N.J.

[21] Appl. No. 868,149
[22] Filed Oct. 21, 1969
[45] Patented Oct. 12, 1971
[73] Assignee Bell Telephone Laboratories, Incorporated
Murray Hill, Berkeley Heights, N.J.

[54] MODE-LOCKED LASER
5 Claims, 3 Drawing Figs.

[52] U.S. Cl. .......... 331/94.5
[51] Int. Cl. .......... H01s 3/00
[50] Field of Search .......... 331/94.5

[56] References Cited
UNITED STATES PATENTS

| | | | |
|---|---|---|---|
| 3,412,251 | 11/1968 | Hargrove .......... | 250/199 |
| 3,431,514 | 3/1969 | Oshman et al. .......... | 331/94.5 |

*Primary Examiner*—Ronald L. Wibert
*Assistant Examiner*—Edward S. Bauer
*Attorneys*—R. J. Guenther and Arthur J. Torsiglieri

ABSTRACT: A laser, mode locked by an intracavity phase modulator, can support either of two separate pulse trains and, typically, will switch erratically between the two. To avoid the resulting instability in the laser output, it is proposed to phase modulate the laser at the synchronous frequency, as is done in the prior art and, simultaneously, to phase modulate it at the second harmonic of the synchronous frequency. So modulated, the two pulse trains are phase locked to produce a single, stabilized output pulse train.

INVENTOR
H. SEIDEL
BY
ATTORNEY

MODE-LOCKED LASER

This invention relates to arrangements for stabilizing mode-locked lasers.

BACKGROUND OF THE INVENTION

It is known that a laser, which is mode locked by an intracavity modulator, can support either of two separate pulse trains as its steady-state output. (See, for example, "Switching of Phase-Locked States in the Intracavity Phase-Modulated He-Ne Laser" by G. W. Hong and J. R. Whinnery, published in the July 1969 issue of the IEEE Journal of Quantum Electronics, pp. 367–376). These two pulse trains are essentially identical except that one has its pulses in phase with the modulating signal whereas the other is 180° out of phase with the modulating signal.

The difficulty with this situation is that neither pulse train is preferred over the other and, as a result, both are equally likely to be produced. This leads to an unstable situation wherein there is a random transition between the two states which generates noise in the laser output and makes for a generally unsatisfactory signal source.

It is, accordingly, the broad object of this invention to stabilize mode-locked lasers.

SUMMARY OF THE INVENTION

In a typical mode-locked laser, the cavity wave is modulated at the synchronous frequency C/2L, where C is the wave velocity and L is the electrical length f the cavity. In accordance with the present invention, the cavity wave is simultaneously modulated at this frequency and at a harmonic of this frequency. When this is done, the two so-called "super modes" are no longer independent of each other and, as a consequence, the resulting single pulse train is stable, thereby eliminating the noisy condition existing in prior art mode-locked lasers.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
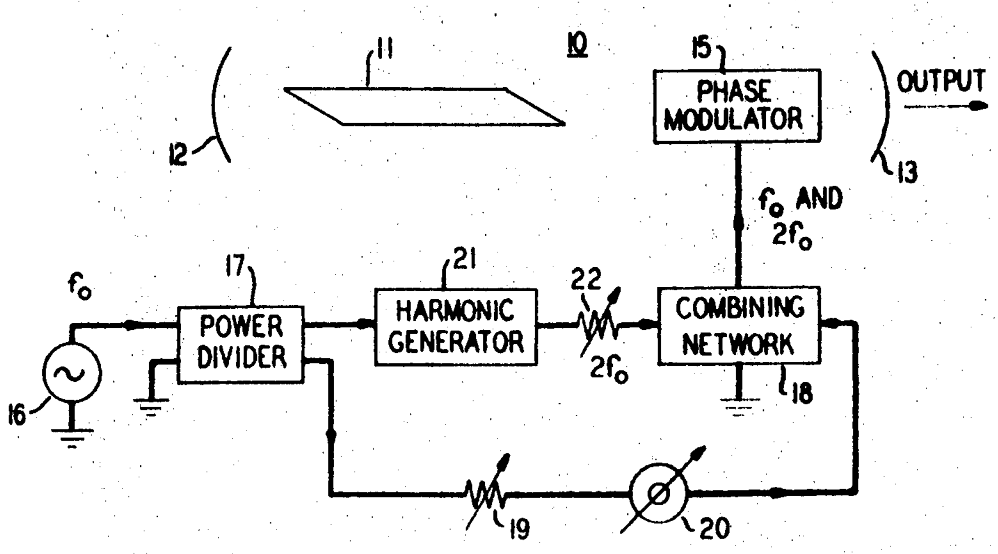
FIG. 1 shows, in block diagram, a mode-locked laser in accordance with the present invention.

Referring to the drawings, FIG. 1 shows, in block diagram, a mode-locked laser 10, stabilized in accordance with the teachings of the present invention. The laser typically includes an active medium 11 disposed within a resonant cavity defined by mirrors 12 and 13. Normally one of the mirrors 13 is made partially transmissive, so that wave energy can couple out of the cavity.

The active medium 11 can be a gas, a liquid or a solid, suitably pumped by means, not shown, to establish a population inversion in the energy level system of the active medium. The operation of a laser is considered to be sufficiently well known at this time to require no further description.

Located within the cavity, and adjacent to mirror 13, is a phase modulator 15. The latter can be any of the well-known electro-optical materials that experience a change in refractive index when subjected to an electric field. Typical of such materials are lithium niobate ($LiNbO_3$) and potassium dihydrogen phosphate (KDP).

Phase modulator 15 is driven by means of a modulating signal derived from a signal source 16. This signal, which includes two, harmonically related components, is obtained by dividing the output from source 16 into two portions by means of a power divider 17. The first portion, having a frequency $f_0$, is coupled to a combining network 18 through an adjustable attenuator 19 and an adjustable phase shifter 20. The second signal portion is coupled to a harmonic generator 21 whose output includes a component having a frequency $2f_0$. This component is coupled to combining network 18 through an adjustable attenuator 22. Thus, the modulating signal derived from network 18, and applied to phase modulator 15, includes a modulating signal component at frequency $f_0$ and a modulating signal component at frequency $2f_0$.

As is known, an optical laser is capable of oscillating at a plurality of frequencies, or longitudinal modes, whose nominal separation is given by C/2l, where C is the composite phase velocity of the cavity wave, and L is the electrical length of the cavity. The number of possible modes depends upon the doppler-broadened linewidth of the laser gain curve.

In general, these modes oscillate independently of each other and, when observed with a scanning interferometer, consist of a plurality of spikes whose amplitudes vary randomly. It was observed by L. E. Hargrove, however, that if the cavity wave is modulated at a frequency C/2L, equal to the mode-to-mode spacing, these random amplitude fluctuations can be eliminated. More particularly, the sidebands created by the modulation process tend to phase lock the next adjacent modes, creating a phase coherency among all the modes. This has the effect of establishing a strong beat signal which converts the laser output from a nominally continuous wave output to a pulsed output of so-called "super mode" having a pulse repetition rate equal to the modulating frequency C/2L.

Figure 2:
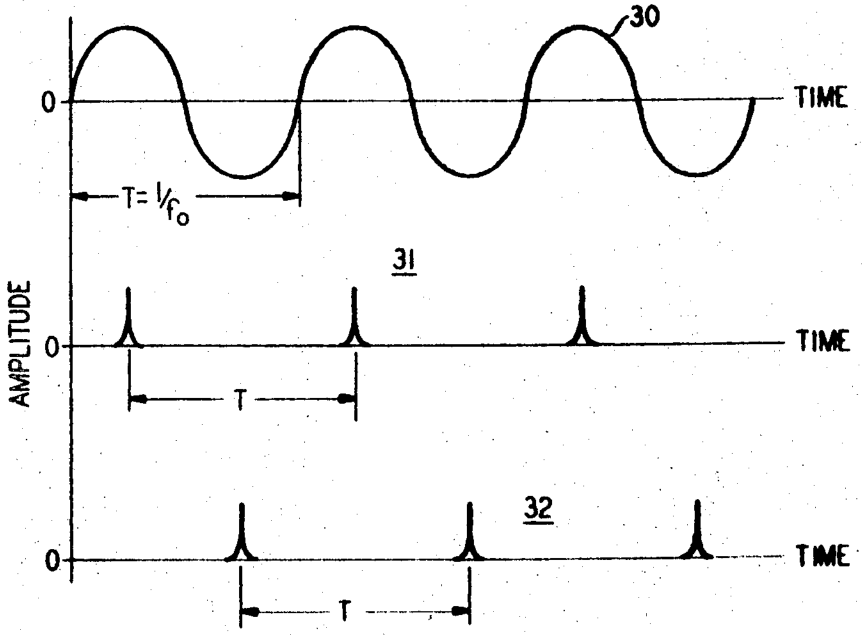
FIG. 2 shows the fundamental modulation signal used in prior art mode-locked lasers and the two, out-of-phase supermodes typically produced by said modulation.

Analysis has shown, and observations have confirmed, that there exists two solutions for a laser that is phase locked by intracavity synchronous modulation. For one solution, the peaks of the output pulse train are in phase with the modulating signal, whereas in the second solution, they are 180° out of phase with the modulating signal. This is illustrated in FIG. 2, which shows the modulating signal 30; one pulse train 31 in phase with the modulating signal; and the second pulse train 32 out of phase with the modulating signal.

The difficulty with this situation is that the two super modes are essentially alike and each is as likely to occur as the other. As a consequence an instability exists which manifests itself in a random switching back and forth between the two pulse trains.

The present invention eliminates the above-described instability by further locking the two super modes relative to each other. This is done by simultaneously modulating the cavity wave at both the fundamental synchronous frequency, $f_0$, and at a harmonic, such as the second harmonic of this frequency, $2f_0$. As indicated, hereinabove, the sidebands created by modulation at frequency $f_0$, phase lock each mode to its nearest adjacent modes, i.e., C/2L hertz away. Modulation at $2f_0$, phase locks each mode to its next nearest adjacent modes, i.e., C/L hertz away. The result of phase locking each mode to its nearest and next nearest adjacent mode is to phase lock the two super modes so that they are no longer independent of each other and to create, thereby, a single, stabilized super mode.

The preferred relative amplitudes and phases of the two modulating signal components are extremely difficult to calculate. Observation, however, has demonstrated that their relative amplitudes and phases are not particularly critical. For example, in one experimental series of observations, signals of equal amplitude were applied to combining network 18 and their relative phase varied by means of phase shifter 20. It was observed that stable operation could be obtained over a ±5° range of phase settings about an optimum relative phase $\theta$. The optimum setting was determined by measuring the intensity of the second harmonic of the optical output signal, which measurement is an indication of the phase correlation of the laser modes. As the phase is varied from this optimum phase, the second harmonic decreases, indicating a decrease in phase coherency. Phase locking of the super modes is lost at a relative phase of $\theta$+90°. Optimum conditions are reestablished at $\theta$+180°.

Similarly, with the phase maintained constant, the relative amplitudes of the two signals could be varied as much as ±10db. without loss of phase locking.

Figure 3:
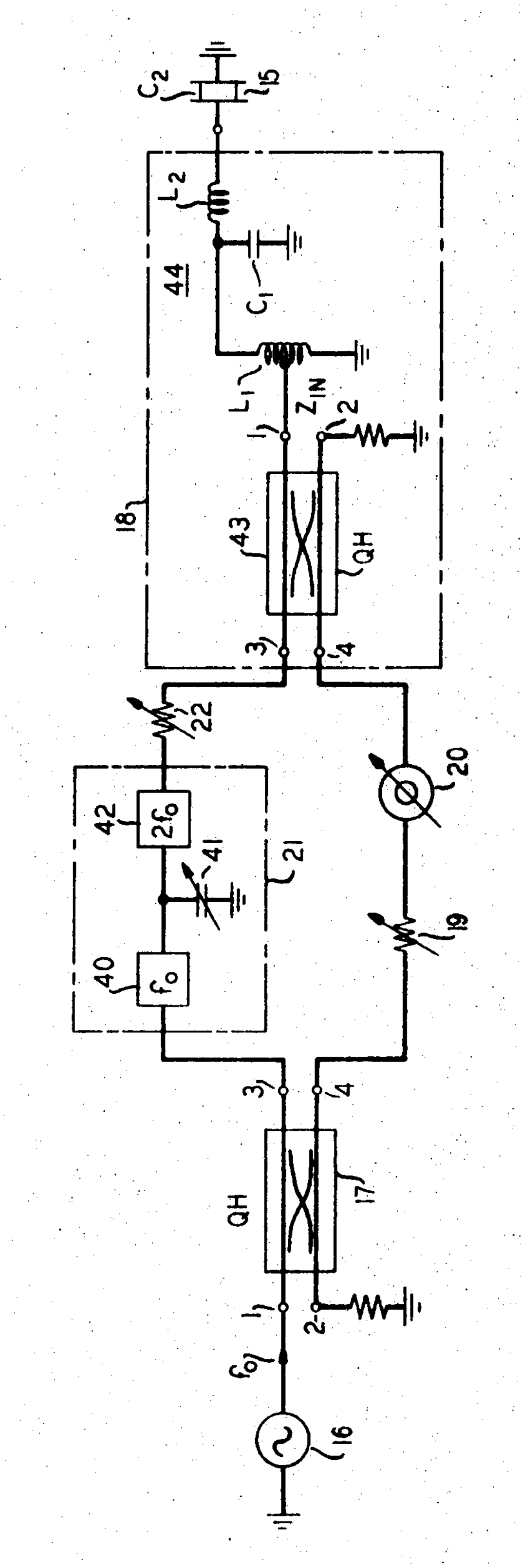
FIG. 3, included for purposes of illustration, shows one embodiment of a modulating circuit.

FIG. 3, included for purposes of illustration, shows the modulator circuit of FIG. 1 in somewhat greater detail. For example, power divider 17 is more specifically identified as a quadrature hybrid coupler. Harmonic generator 21 is shown comprising a band-pass filter 40, tuned to the synchronous frequency $f_0$; a varactor diode 41; and a band-pass filter 42, tuned to frequency $2f_0$. Combining network 18 is shown to include a quadrature hybrid coupler 43, and a novel coupling network 44 which has a double resonance at frequencies $f_0$ and $2f_0$. The coupling network includes a first inductor $L_1$,a shunt capacitor $C_1$ and a series inductor $L_2$. The latter is connected to phase modulator 15, whose self-capacitance $C^2$ is the last element of the network. MOre specifically, expressing the reactance of the phase modulator at frequency $f_0$ as $$(1/\omega_0 C_2)=2R_0, \qquad (1)$$

the reactance of the other elements of the network are given as $$\omega_0 L_2=R_0, \qquad (2)$$

$$(1/\omega_0 C_1)=R_0, \qquad (3)$$

and $$(\omega_0 L_1=(R_0/2.) \qquad (4)$$

Proportioned in this manner, the phase modulator is simultaneously resonant at frequencies $f_0$ and $2f_0$.

The signal derived from coupler 43 is coupled into network 44 at a tap along inductor $L_1$. Since the coupler impedance is typically much less than the phase modulator impedance, the loading of the input circuit upon the coupling network is relatively small.

In all cases it is understood that the above-described arrangement is illustrative of but one of the many possible specific embodiments which can represent applications of the principles of the invention. Numerous and varied other arrangements can readily be devised in accordance with these principles by those skilled in the art without departing from the spirit and scope of the invention.

I claim:

1. A mode-locked laser oscillator comprising:

an active medium disposed within a resonant cavity;

means located within said cavity for phase modulating the laser oscillations; and means for simultaneously exciting said phase-modulating means at the synchronous frequency of said laser and at an even harmonic of said synchronous frequency where the relative amplitudes and phases of said excitation frequencies produce a stable pulse train of oscillation corresponding to a single super mode.

2. The oscillator according to claim 1 wherein said synchronous frequency is equal to C/2L, where C is the composite phase velocity of said oscillations, and L is the electrical length of said cavity;

and wherein said harmonic is the second harmonic of said frequency.

3. The oscillator according to claim 2 including:

a modulation signal source having a frequency $f_0$=C/2L;

means coupled to said source for generating a second harmonic of said frequency;

and coupling means for coupling modulating signal components at said frequency and at the second harmonic of said frequency to said phase modulating means.

4. The oscillator according to claim 3 wherein said coupling means comprises a shunt-connected inductance $L_1$ and a shunt-connected capacitance $C_1$, connected to one end of a series-connected inductance $L_2$;

wherein said phase modulating means is coupled to the other end of said series-connected inductance;

and wherein said modulating signal components are coupled to a tap on said shunt-connected inductance.

5. The oscillator according to claim 4 wherein $$\omega_0 L_2=R_0$$

$$\omega_0 L_1=(R_0/2)$$

$$1/\omega_0 C_1=R_0$$

where $\omega_0$ is the synchronous angular frequency of said cavity, and $2R_0$is equal to the reactance of said phase-modulating means at said synchronous frequency.